Figure 2:
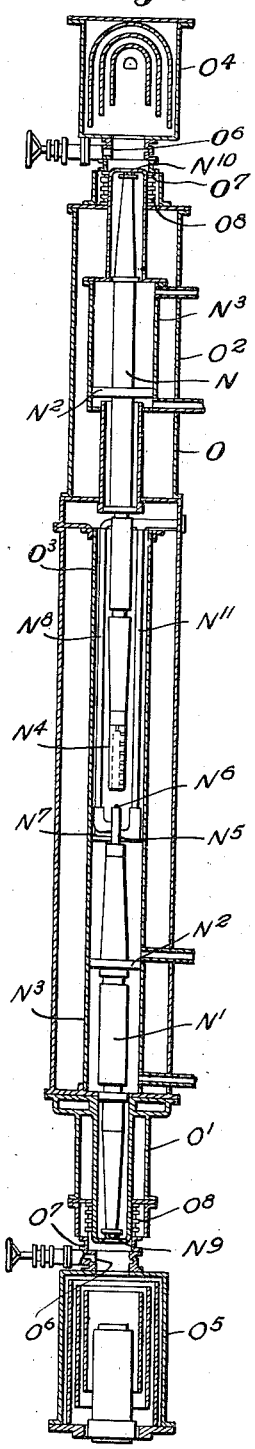

Jan. 28, 1941.  A. ALLAN ET AL  2,229,627
METAL-CLAD ELECTRIC SWITCHGEAR
Filed Nov. 14, 1938

Inventor
Archibald Allan
Frank Coates
by
Watson, Cole, Grindle & Watson
Attorney Patented Jan. 28, 1941

2,229,627

UNITED STATES PATENT OFFICE 2,229,627

METAL CLAD ELECTRIC SWITCHGEAR

Archibald Allan, Tynemouth, and Frank Coates, Cleadon, England, assignors to A. Reyrolle & Company, Hebburn-on-Tyne, England, a company of Great Britain Application November 14, 1938, Serial No. 240,414
In Great Britain November 15, 1937

8 Claims. (Cl. 200—48)

This invention relates to metal-clad electric switchgear wherein a movable conductor in its operative position projects through an orifice in the wall of a chamber and makes contact with a busbar or other conductor surrounded by insulating medium therein and a device for sealing the orifice when the movable conductor has been withdrawn from its operative position.

Although the use of oil as the insulating medium in such switchgear has advantages, it is open to objection on the ground of inflammability and the presence of large bodies of oil in the switchgear (more especially for the higher ranges of voltage) is undesirable, notwithstanding the enclosure of such bodies of oil in separate strong metal casings, in view of the risk of fire spreading to dangerous proportions.

An object of the present invention is to eliminate or materially reduce risk of a dangerous fire by filling the chamber or each chamber, into which the movable conductor projects, with an insulating gas whose dielectric strength within the chamber appreciably exceeds that of air at atmospheric pressure.

A further object of the invention is to provide improved switchgear of the above type wherein the movable conductor normally connects a busbar or other conductor in a chamber filled with the said gas to a circuit-breaker or other apparatus enclosed in a tank, the said conductor being longitudinally movable towards or into the tank to break the connection whereupon the orifice in the wall of the chamber through which the conductor has been withdrawn is sealed in a gas-tight manner by a sealing device.

Yet another object of the invention is to provide improved switchgear comprising a circuit-breaker furnished with an arc-control device immersed in a small volume of insulating liquid in a tank enclosed within and insulated from an outer casing disposed between two chambers filled with the said gas and respectively containing two contacts which are normally connected to the circuit-breaker contacts by two collinear longitudinally movable isolating conductors which can be withdrawn into the outer casing to permit both chambers to be sealed in a gas-tight manner by the sealing devices.

According to yet a further object of the invention dry air at a pressure above atmospheric pressure, or nitrogen, carbon dioxide, or other gas which will not support combustion, or a chemically inert gas such as argon is employed as the insulating gas.

Another object of the invention is to employ, as the insulating gas, a gaseous fluorinated chloro-paraffin, for example dichloro-difluoro-methane, at or above atmospheric pressure.

Figure 1:
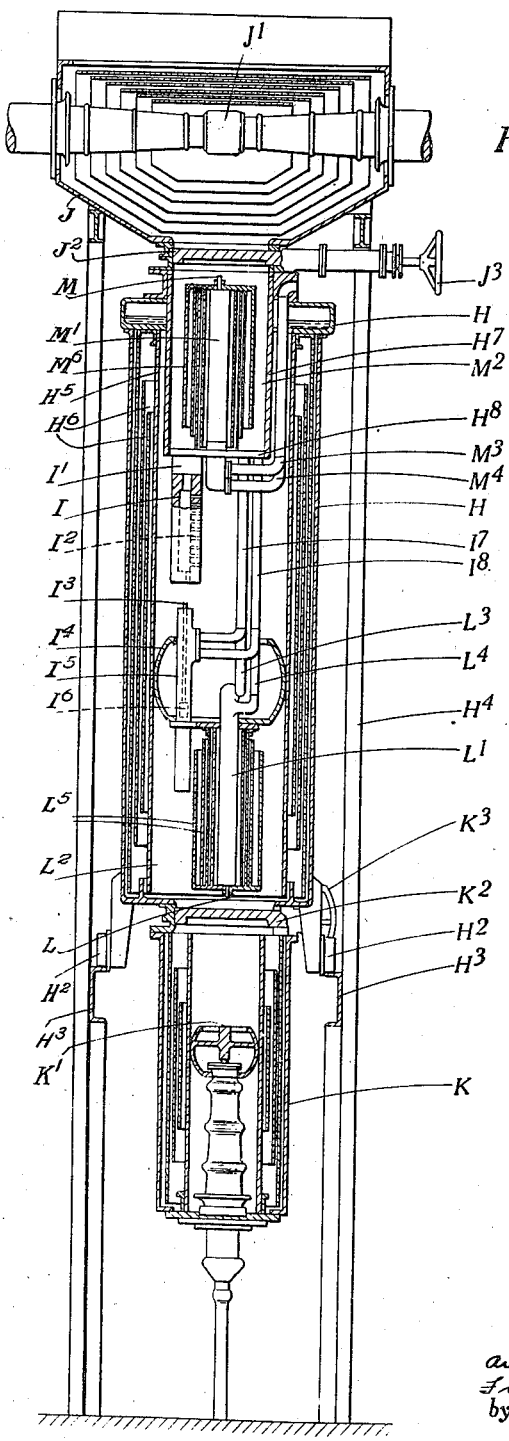

These and further objects of the invention will be apparent from the following description of the accompanying drawing which illustrates some practical embodiments of the invention and wherein, Figure 1 illustrates one arrangement in vertical section, and Figure 2 shows a modification of the arrangement shown in Figure 1.

In the arrangement shown in Figure 1 the circuit-breaker in each phase is of the single-break type immersed in oil in a small tank enclosed within an outer metal casing and the connections from the circuit-breaker to the busbar and to the feeder cable are in line with one another. The three outer casings H (one only of which is shown) have a common cover plate containing a conservator tank $H^1$ for the three circuit-breakers, the casings H being removable horizontally as a whole from the fixed portion of the gear comprising the busbar chambers J and feeder chambers K, the outer casing structure being supported on rollers $H^2$ on guides $H^3$ on a metal framework $H^4$ which supports the busbar chambers J. Each outer casing H is generally cylindrical and contains an insulating cylinder $H^5$ extending from the base of the casing H to the cover plate, the upper part of the cylinder $H^5$ constituting the oil-filled circuit-breaker tank. The intervening space between the casing H and the insulating cylinder $H^5$ is filled with compressed air or other gas, or with a gaseous fluorinated chloro-paraffin at or above atmospheric pressure. Stress-grading intermediate cylinders $H^6$ may be arranged in this gas-filled space.

A further short insulating cylinder $H^7$ extends through the cover plate and down into the circuit-breaker tank $H^5$ and is closed at its lower end by a metal plate $H^8$ which carries beneath it the fixed contact housing $I^1$ of the circuit-breaker. Suspended from the housing $I^1$ is an arc-control device I, which comprises an insulating enclosure with lateral vents $I^2$ and is preferably of the kind described in one or other of British patent specifications Nos. 435,250, 435,308, 452,146 and 460,219 standing in the names of one of the present applicants and others, the moving contact of the circuit-breaker being in the form of a vertically sliding rod $I^3$ which enters the arc-control device I through the lower end thereof to engage with the fixed contact. Thus, on opening of the circuit-breaker the downward movement of the rod $I^3$ draws out the arc close to the lateral vents $I^2$ within the arc-control device I and the relatively high pressure generated therein by the arc during the arcing period causes a blast of deionising fluid to be ejected through the arc path and through the lateral vents $I^2$, whereby the arc is extinguished during the first cycle or the first few cycles of the alternating current wave.

The lower end of the circuit-breaker tank is closed at a suitable height within the outer casing by a metal carrier $I^4$ supporting an upwardly directed metal tube $I^5$ for housing the moving contact rod $I^3$, which terminates at its lower end in a piston $I^6$ sliding in a cylinder within the metal tube $I^5$, whereby hydraulic operation of the contact rod $I^3$ can be effected by controlling the liquid pressures in the ends of the said cylinder above and below the piston $I^6$.

The metal carrier $I^4$ also carries a downwardly directed metal tube $L^1$ for housing a longitudinally movable isolating plug L, the tube $L^1$ also containing a cylinder for the hydraulic operation of the plug L. A similar hydraulically operated isolating plug M is housed in an upwardly directed metal tube $M^1$ carried by the metal plate $H^8$ at the base of the short insulating cylinder $H^7$. The spaces $L^2$, $M^2$ within which the two isolating plugs L and M move are filled with compressed gas or with a gaseous fluorinated chloro-paraffin at or above atmospheric pressure, and are normally in open communication with the gas-filled interiors of the feeder chamber K and bus bar chamber J, the plugs L and M in their normal outermost positions making engagement with a feeder contact $K^1$ and a bus bar contact $J^1$ within the chambers K and J. When the plugs L and M are withdrawn into their isolating positions (as shown in the drawing) they lie wholly within the interior of the outer casing, and sluice valves $J^2$, $K^2$ operated by handwheels $J^3$, $K^3$ are provided by means of which the busbar and feeder chambers J and K can be sealed, thereby permitting the outer casing structure H to be removed along the guides $H^3$ without allowing the escape of the gas from the chambers J and K, the only wastage of gas consisting of the relatively small bodies thereof in the spaces $L^2$, $M^2$ around the isolating plugs L and M.

The pipes $I^7$, $I^8$ for conveying the hydraulic operating liquid to the tube $I^5$ housing the moving contact rod $I^3$, the pipes $L^3$, $L^4$ for conveying the hydraulic operating liquid to the tube $L^1$ housing the isolating plug L, and the pipes $M^3$, $M^4$ for conveying the hydraulic operating liquid to the tube $M^1$ housing the isolating plug M, pass down through the annular space between the insulating tank cylinder $H^5$ and the short insulating cylinder $H^7$, and thence into and (where necessary) through the circuit-breaker tank proper, the pipes (all of which are of insulating material) being spaced well away from the vented side of the arc-control device I. The reservoir for the hydraulic operating liquid and the actuating device for controlling the flow of liquid through the pipes $I^7$, $I^8$, $L^3$, $L^4$, $M^3$, $M^4$ may be mounted in or on the top of the cover plate of the outer casings H so as to be movable therewith, or alternatively may be located in a convenient position on the fixed portion of the gear, means being provided in the latter event for disconnecting the parts of the pipes in the two portions of the gear from one another, when it is desired to remove the outer casings H from the fixed portion.

With the parts in the positions shown in the drawing the circuit-breaker is open and the plugs L and M are in their isolating positions, the sluice valves $J^2$ and $K^2$ being closed so that the casings H can be removed from the fixed portions of the gear. This operation can be effected without loss of gas from the busbar chambers J or feeder chambers K. If now the circuit is to be reestablished the casings H are restored to their operative positions and reattached in a gas-tight manner to the valve chests of the sluice valves $J^2$, $K^2$. By opening the sluice valves $J^2$ and $K^2$ and supplying liquid under pressure through the pipes $L^3$ and $M^4$ the isolating plugs, L and M (together with stress-grading barriers $L^5$ and $M^6$) are moved into the feeder and busbar chambers K and J respectively so that the plugs L and M engage the feeder and busbar contacts $K^1$, $J^1$. By supplying liquid under pressure through the pipe $I^8$ the moving contact rod $I^3$ is moved up into the arc-control device I so as to close the circuit-breaker.

The circuit-breaker can be opened by supplying liquid under pressure through the pipe $I^7$ so as to move the plunger $I^6$ and contact rod $I^3$ away from the arc-control device. Similarly the plugs L and M can be moved into their isolating positions shown in the drawing by supplying liquid under pressure through the pipes $L^4$ and $M^3$.

The arrangement shown in Figure 1 may be modified by replacing each isolating plug by a longitudinally movable conductor surrounded by an insulating bushing movable with the conductor. One such arrangement is shown in Figure 2 in which each of the insulating bushings N, $N^1$ is formed with an external piston surface $N^2$ sliding within a cylinder $N^3$, the cylinders $N^3$ being formed respectively in the top plate $O^2$ of the outer casing O and in the lower extension of the circuit-breaker tank $O^3$ for hydraulic or pneumatic operation of the bushings N, $N^1$. The circuit-breaker fixed contact structure, together with the arc-control device $N^4$, are carried on the lower end of the upper longitudinally movable bushing N, so as to be movable therewith. The lower bushing $N^1$ telescopes with the cylinder $N^5$ which houses the moving contact rod $N^6$ of the circuit-breaker, the cylinder $N^5$ being, as in Figure 1, supported by a carrier $N^7$ closing the lower end of the oil-filled upper portion of the circuit-breaker tank $O^3$. The space between the outer casing O and the circuit-breaker tank $O^3$, as also the busbar chamber $O^4$ and feeder chamber $O^5$, is filled with air or other gas under pressure, or with a gaseous fluorinated chloro-paraffin at or above atmospheric pressure. Stress-grading layers may be provided as shown in the busbar and feeder chambers $O^4$ and $O^5$, and also between the outer casing O and the circuit-breaker tank $O^3$.

To open the circuit-breaker liquid is supplied under pressure through a pipe $N^8$ to the cylinder $N^5$ so that the moving contact rod $N^6$ is withdrawn from the arc-control device into the position shown. The bushing $N^1$ is then moved upwards so that the feeder isolating contact $N^9$ is moved into the isolating position shown wholly within the base plate $O^1$. The bushing N is next moved down so that the busbar isolating contact $N^{10}$ lies wholly within the top plate $O^2$ and the arc-control device $N^4$ is in its lowermost position shown. The sluice valves $O^6$ can now be closed and the casing O together with the circuit-breaker and isolating bushings can be removed from the fixed portions of the gear. Each valve chest is normally connected in a gas-tight manner through a ring $O^7$ and bellows $O^8$ to the top plate $O^2$ or base plate $O^1$. For reestablishing the circuit the sluice valves $O^6$ are reopened, after reconnecting the rings $O^7$ to the valve chests, and the bushings N and $N^1$ are moved outwards into cooperation with the busbar and feeder contacts. Liquid under pressure is then supplied through the pipe $N^{11}$ to the cylinder $N^5$ so that the moving contact rod $N^6$ is moved into the arc-control device $N^4$ thus closing the circuit-breaker.

This modification has the advantage of enabling the lateral dimensions of the gear to be materially decreased at the expense of increase in the height of the gear.

When a gaseous fluorinated chloro-paraffin is employed as the gas filling, at or above atmospheric pressure, the gas used is preferably dichloro-difluoro-methane but other suitable examples are trichloro-fluoro-methane and dichloro-tetrafluoro-ethane. The gaseous filling may be constituted by a single fluorinated chloroparaffin or by a gaseous mixture such for example as a mixture of air in equilibrium with the gaseous fluorinated chloro-paraffin, the dielectric strength of this gaseous mixture preferably being at least one and a half times that of air. The gas filling may be provided by the vapour from a fluorinated chloro-paraffin present as a volatile liquid in the chamber or chambers of the switchgear, or in a reservoir communicating with the said chamber or chambers.

What we claim as our invention and desire to secure by Letters Patent is:

1. In metal-clad electric switchgear of the draw-out type, in combination, a fixed part including two chambers filled with insulating gas whose dielectric strength within the chambers appreciably exceeds that of air at atmospheric pressure, and a main conductor within each chamber, a movable part including a tank disposed between said chambers, a circuit-breaker immersed in insulating liquid within the tank, two longitudinally movable isolating conductors normaly projecting from opposite ends of the tank through orifices in the walls of said chambers thereby establishing connections between the circuit-breaker and the main conductors, means for withdrawing the isolating conductors from said chambers, and devices for sealing the said orifices when the isolating conductors have been withdrawn but before the movable part of the gear is withdrawn from the fixed part.

2. In metal-clad electric switchgear of the draw-out type, in combination, a fixed part including two chambers filled with an insulating gas whose dielectric strength within the chambers appreciably exceeds that of air at atmospheric pressure, and busbar and feeder contacts within the chambers respectively, a movable part including a tank disposed between said chambers, a circuit-breaker immersed in insulating liquid within the tank, two compartments at opposite ends of the tank each filled with the said insulating gas, two longitudinally movable isolating conductors electrically connected to the circuit-breaker and normally extending from said compartments through orifices in the walls of the said chambers into contact with the busbar and feeder contacts, means for withdrawing the isolating conductors from said chambers into the two compartments, and devices for sealing the orifices when the isolating conductors have been withdrawn but before the movable part of the gear is withdrawn from the fixed part.

3. In metal-clad switchgear of the draw-out type, in combination, a fixed part including two chambers filled with dichloro-difluoro-methane gas, a busbar contact in one chamber and a feeder contact in the other chamber, a movable part comprising a tank disposed between said chambers and including an outer casing, an inner casing radially spaced from the outer casing, the annular space between the inner and outer casings being filled with insulating gas, a circuit-breaker immersed in insulating liquid within the inner casing, two compartments at opposite ends of the tank respectively and each filled with dichloro-difluoro-methane gas, two longitudinally movable isolating conductors electrically connected to the circuit-breaker and normally extending from said compartments through orifices in the two chambers thereby establishing connections between the circuit-breaker and the busbar and feeder contacts, fluid-operated means for withdrawing the isolating conductors from said chambers into the gas-filled compartments, devices for sealing the two orifices when the isolating conductors have been withdrawn, and gas-tight couplings between the said compartments and the orifices controlled by the sealing devices, said couplings being released, after withdrawal of the isolating conductors, to permit withdrawal of the movable part of the switchgear from the fixed part.

4. Metal-clad electric switchgear as claimed in claim 1, in which the insulating gas is constituted by a stable halogenated paraffin which is gaseous at ordinary atmospheric temperatures and wherein at least a substantial part of the substituted halogen is fluorine.

5. In metal-clad electric switchgear of the draw-out type, in combination, a fixed part comprising two chambers filled with insulating gas whose dielectric strength within the chambers exceeds that of air at atmospheric pressure, and two contacts arranged in the two chambers respectively, a movable part comprising a tank disposed between said chambers, a circuit-breaker immersed in insulating liquid within the tank, two collinear longitudinally movable isolating conductors electrically connected to the circuit-breaker and normally extending from opposite ends of the tank through orifices in said chambers thereby establishing connections between the circuit-breaker and the said contacts, means for withdrawing the two conductors into the tank, and devices for sealing the said orifices when the conductors have been withdrawn but before the movable part of the gear is withdrawn from the fixed part.

6. In metal-clad electric switchgear, in combination, two chambers filled with insulating gas whose dielectric strength within the chambers exceeds that of air at atmospheric pressure, a circuit-breaker tank disposed between said chambers, a circuit-breaker immersed in insulating liquid within the tank and comprising two cooperating contacts which are relatively movable in the direction of the longitudinal axis of the tank, two isolating conductors collinear with and electrically connected to said circuit-breaker contacts respectively, the isolating conductors normally extending from opposite ends of the tank through orifices in the two chambers thereby establishing connections with the contacts therein, means for withdrawing the isolating conductors collinearly with the direction of relative movement of the circuit-breaker contacts, into the tank, and devices for sealing the orifices when the isolating contacts have been withdrawn.

7. In metal-clad electric switchgear of the draw-out type, in combination, a fixed part comprising two chambers filled with a gaseous fluorinated chloro-paraffin, a busbar contact in one chamber and a feeder contact in the other chamber, a movable part comprising a circuit-breaker tank disposed between the two chambers, a circuit-breaker immersed in insulating liquid within the tank and comprising an arc control device and a cooperating rod-like contact movable in the direction of the longitudinal axis of the tank, two cylinders at opposite ends of the tank respectively, two isolating conductors electrically connected respectively to the arc control device and rod-like contact and normally projecting from opposite ends of the tank through orifices in the busbar and feeder chambers thereby establishing electrical connection between the circuit-breaker and the busbar and feeder contacts, a piston carried by each isolating contact and movable in the corresponding cylinder, means for supplying fluid under pressure to said cylinders for withdrawing the isolating conductors from the orifices, devices for sealing the orifices when the isolating conductors have been withdrawn, and releasable gas-tight couplings between the tank and the orifices controlled by said sealing devices.

8. Metal-clad electric switchgear as claimed in claim 5, in which the insulating gas is constituted by dichloro-difluoro-methane.

ARCHIBALD ALLAN.
FRANK COATES.